Figure 1:
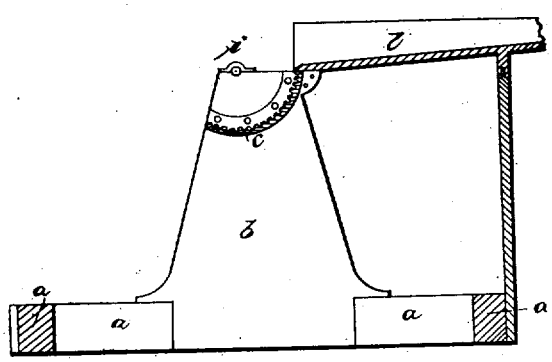
Figure 2:
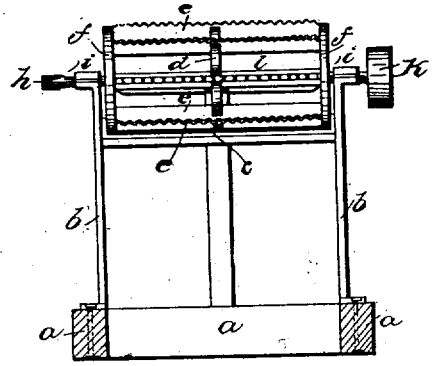
Figure 3:
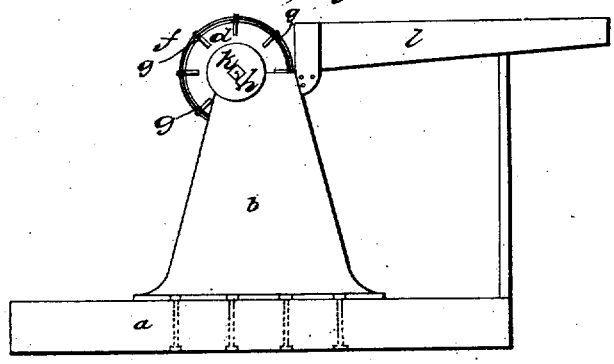

8300X

M. AMES & I. WRIGHT.

Thrashing Machine.

Patented July 10, 1834.

THE NATIONAL LITHOGRAPHING COMPANY,
WASHINGTON, D. C.

8300X

Michael Ames & John Wright
Patent for a thrashing machine

The schedule referred to in these Letters Patent, & making part of the same, containing a description in the words of the said Michael Ames & John Wright themselves, of their improvement in the thrashing Machine To all, to whom these Presents shall come
Be it known, that we Michael Ames & John Wright of Fredericsburg in the county of Spottsylvania and State of Virginia, have invented a new and useful improvement in the thrashing Machine, and that the following is a full and exact description of the construction and operation of the said Machine as invented by us —

A square frame is to be constructed of four by six inch timber, five feet in length by two feet four inches in width. The cross pieces are to be placed four feet ten inches apart. On the top of this frame and within the space between the cross pieces, is to be secured an upright end of a frame, one upon each sill to be made of iron, of about two feet four inches in height and nine inches deep by one broad. These upright ends are to be wider at the bottom than at the top, & the connecting piece at the top between the two uprights, is to be sufficiently deep to allow of that portion of a circle for a concave bed, as may be equal to about one third, and of a diameter large enough for the revolution of a cylinder of fourteen inches in diameter, within it. The feet of these upright ends, are to be secured by means of projections from them along the top and down the inside of the sides. The tops have holes through them for the insertion of bolts by which they are secured to the sills. Along the circumference of the circular sides, are to be holes for the reception of bolts, to

6300X pass through flanges on the corresponding edges of the concave bed—

Across the top of these end pieces and at about the centre are to be secured by brass boxes (resting on flanges projecting for that purpose, so as to bring the boxes on a line with one drawn from the centre of the concave bed. The end of a shaft or axis of iron, three feet six inches in length and about one and a half inch square—

On this shaft, and within side the ends, are to be secured three heads of a circular form of thirteen inches in diameter, and about one inch thick, having around the circumference eight or more grooves for the reception of as many notched beaters to be secured therein by a band passing around the circumference, with a key to each— On either end of this shaft, as may be found most convenient, is to be secured a pulley of seven inches in diameter, by which the motion is to be communicated to the cylinder either from animal or other power The beaters are to be made of wrought iron of about two inches deep and half an inch wide, with notches projecting along the whole length of from about one eighth to one quarter of an inch beyond the line of the surface. These notches or teeth are to project about one half an inch beyond the circumference of the heads, and are to be about one half an inch wide, and about the same distance apart. These beaters are thus secured for the purpose of being able to take them off in case of need to repair, by loosening the band and wedge——

The concave bed in which these beaters work is formed of iron, having the inside surface fluted into bars, and about half an inch apart and rising each to an angle in the centre, and is to be secured to the heads by means of the bolts above described. The top of this bed is to be on the same line with that of the top of the end frames and is to descend along the circular connecting pieces formerly described a length equal to one third of a circle. This beating cylinder is to be covered with a case of sheet iron resting on the tops of the end frames.

Projecting at an angular elevation from the front side of the machine is to be secured a feeding table of about three feet six inches in length, and width equal to the length of the Cylinder. At each end ~~of the cylinder~~ is to be attached a ledge rising from the surface to about six inches, tapering towards the top to about three. The ends next the cylinder are to be set at the distance of the length of the cylinder apart, while the tops will diverge leaving more open space at the top of the table. A shoulder is formed on the lower end of the projections to which the table is fastened, by means of which it is ~~fastened~~ secured in its position by bolts passing through the end frames of iron, and the portions of said projections left on the inside of the frames for that purpose. This table is to be made of wood. The operation of this machine is as follows.

The grain in the straw is presented on the feeding table to the action of the cylinder by which it is drawn along the concave bed, and in its passage is subjected to such friction by the revolutions of said cylinder, as loosens the grain from the straw and deposites them both separately beneath the cylinder.

Our claim will be for the combination and arrangement of these several parts of our machine as above described.

In testimony, that the above is a true and correct description of the construction and operation of our machine, as constructed and used by us, we have hereunto set our hands, this second day of July Eighteen Hundred and Thirty four Witnesses
Philip Alexander
P. Thornton Michael Ames John Wright

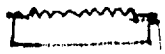

1144 wds]

Drawing

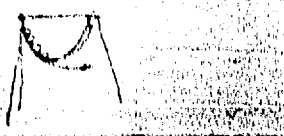

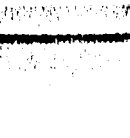

[illegible]